No. 623,530. Patented Apr. 25, 1899.
T. DUNCAN.
ELECTRIC METER.
(Application filed Aug. 13, 1898.)

(No Model.) 2 Sheets—Sheet 1.

Witnesses
Samuel A. Bachtel
Adelaide Kearns

Thomas Duncan Inventor
By his Attorneys Chapin & Denny

No. 623,530.  
T. DUNCAN.  
ELECTRIC METER.  
(Application filed Aug. 18, 1898.)  
Patented Apr. 25, 1899.
(No Model.) 2 Sheets—Sheet 2.
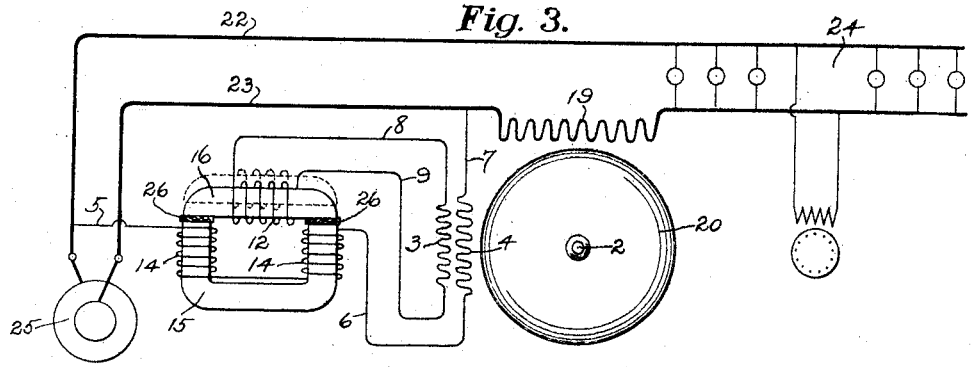
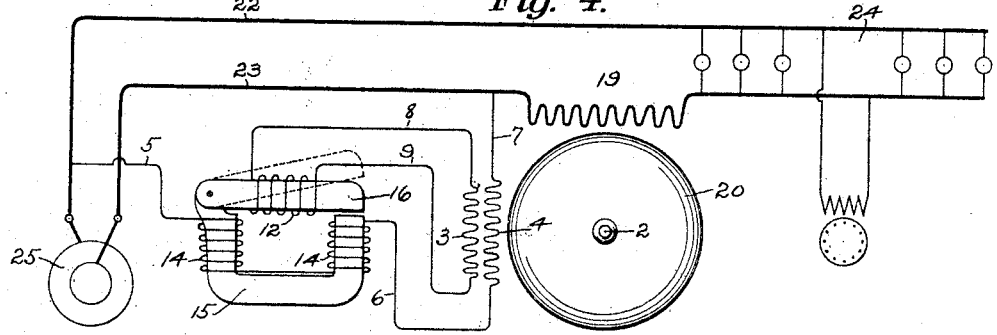
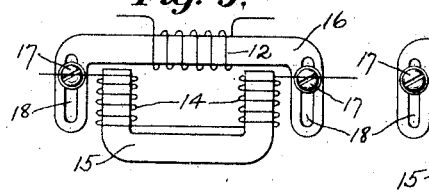 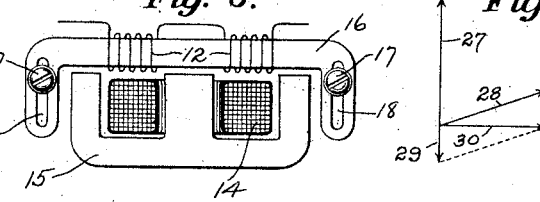 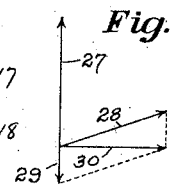
Witnesses  
Samuel A. Bachtel  
Adelaide Kearns.
Thomas Duncan Inventor  
By his Attorneys Chapin & Denny

UNITED STATES PATENT OFFICE.

THOMAS DUNCAN, OF FORT WAYNE, INDIANA.

ELECTRIC METER.

SPECIFICATION forming part of Letters Patent No. 623,530, dated April 25, 1899.

Application filed August 13, 1898. Serial No. 688,493. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in induction-motor meters for single-phase alternating currents, or those in which a closed revoluble metallic armature is actuated by a shifting magnetic field.

The principal objects of this invention are an improved method of and means for obtaining a magnetic field in quadrature with the electromotive force which it represents, to provide a meter adapted to meet the requirements of the present state of the art by measuring the real or true energy in circuits carrying lagging currents, to provide an improved method of and means for adjusting the phase angle of the magnetism representing the electromotive force of such simplicity that a central-station employee of ordinary skill and knowledge of meters can readily make an adjustment without assistance, to provide a meter in which the adjustment of the magnetism of the volt field or coil to quadrature or ninety degrees can be readily made on any of the systems now in use, and to provide a meter of economical construction that is applicable alike to high and low frequencies, in which the phase adjustment is made without varying the resistance of any closed secondary circuits, thereby obviating the necessity of soldered and clamped joints, which are liable to get out of order and cause derangement of the original adjustment, the readjustment of which requires the aid of an expert.

In the drawings which form part of this specification, and in which similar reference-numerals indicate like parts, Figure 1 is a front elevation of my invention, showing the actuating-motor coils, with one of them in cross-section, and also showing an improved impedance-coil in vertical central section having a portion of its magnetic core adjustable. Fig. 2 is a sectional view of my improved impedance-coil, showing a slightly-modified form of the adjustable portion of its magnetic core. Figs. 3 and 4 are also modified forms of my invention, showing a cylindrical armature instead of a disk armature. Fig. 5 shows, diagrammatically, the windings of the impedance-coil. Fig. 6 shows the impedance-coil proper in vertical section and shows the phasing-coils diagrammatically. Fig. 7 shows the manner in which the ninety-degree resultant of the magnetism of the volt-coil is obtained, all of which is more fully described hereinafter.

The principal elements employed in my invention are a source of single-phase alternating currents, supply-mains 22 and 23 for the translating devices 24, a series coil 19, a revoluble metallic armature 20, a volt-coil 4, an auxiliary coil 3, an impedance-coil 14, a laminated iron core 15 for said impedance-coil, an adjustable iron core or portion 16, phasing-coils 12 wound upon said adjustable portion 16, a spindle 2, a registering mechanism 1, and a permanent magnetic field 21.

In describing my invention particular reference is made to Fig. 1, in which the ampere-coil 19 is connected in series in the supply-main 22, so that the strength of its magnetic field will be proportional to the current supplied to the translating devices 24. The revoluble aluminium disk armature 20 is placed adjacent to and in inductive relation to the said series coil 19 and is secured in any suitable manner to the upright spindle 2, which rests and forms a bearing upon the step or jewel 11. Adjacent to the opposite or upper side of the said disk armature is properly mounted a pressure or volt coil 4, having numerous turns of fine wire and connected in series with the impedance-coil 14, both of which receive current from the supply-mains by the wires 5, 6, and 7. Another or auxiliary coil 3 of fewer turns is wound inside of the volt-coil 4, as shown, and has its terminals 8 and 9 connected to the two phasing-coils 12. The said coils 12 are wound upon the adjustable portion 16 of the laminated-iron impedance-coil core 15 and may include a variable resistance 10 in series with them and with the auxiliary coil 3. The wires 5 and 7 being connected to the supply-mains in parallel cause a current to traverse the coils 4 and 14, which current is proportional to the electromotive force, as is also the case of the auxiliary coil 3, since it is supplied with current by induction from the said coil 14.

It is well known that to enable the meter to measure inductive loads the magnetic field representing the pressure in volts must be in quadrature therewith or ninety degrees behind the same. For the accomplishment of this purpose I employ the impedance-coil 14 in series with the volt-coil 4 to cause the magnetism of the latter to lag as nearly as possible to ninety degrees. It is also well known that the ohmic resistance of the impedance-coil 4 renders it impossible to obtain a current that will reach ninety degrees. Therefore to obtain the desired quadrature I employ the auxiliary coil 3 in coöperation with the volt-coil 4 and energize it with current from the phasing-coils 12. The manner of making the desired adjustment is illustrated diagrammatically in Fig. 7, in which the line 27 represents the electromotive force in volt. If the impedance of the coil 14 produces a lag of the current and magnetism through the volt-coil 4 to an angle represented by the line 28 and the phase angle of the induced current and magnetism in the auxiliary coil 3 is represented by the lines 29, the resultant magnetism of the said coils 3 and 4 will be represented by the line 30, which is at right angles or ninety degrees from the electromotive force represented by the line 27. The said resultant 30 is obtained by completing the parallelogram by means of the two dotted lines, as shown, but not given a reference-numeral. The phase angle of the magnetism of the said coils 3 and 4 can readily be adjusted by simply raising or lowering the adjustable portion 16 of the impedance-coil core. The novelty and simplicity of this construction are apparent, and its efficiency is due to the fact that when the adjustable portion 16 is moved either up or down it simultaneously changes the phase angle of both the current in the coil 3 and in the coil 4. This, it is believed, has not been heretofore accomplished in the art. If after calibration the meter is found to run slow on inductive loads, it is an indication that the magnetism representing the electromotive is less than ninety degrees, in which the adjustable portion 16 should be brought nearer to the poles of the main portion or coil 15 until the ninety-degree limit is secured. In bringing the adjustable portion 16 toward the main core 15 the magnetism represented by the line 30, Fig. 7, has its angle increased by the simultaneous increase of the angles formed by both the lines 28 and 29. This is due to the increased density of the flux through the said cores 15 and 16 causing the current through the coil 4 to increase its lag with the increased impedance of the coil 14 and also causing the current through the said coil 3 to increase its lag and magnitude by the subjection of the coils 12 to a denser field. It is thus obvious that by a single vertical adjustment of the adjustable portion 16 of the impedance-coil core the resultant magnetism of the coils 3 and 4 can be brought to quadrature in a simple and ready manner.

I have experimentally determined that by having the phasing-coils 12 wound upon the adjustable portion 16, which admits of an air gap or space in the magnetic circuit between them and the impedance-coil 14, the regulation of the meter is improved under varying conditions of the working electromotive force and frequency. The adjustable resistance 10 can be dispensed with, if desired, or when used it may be employed to assist in obtaining the required phase angle in coöperation with the coils 12 and their core 16.

The adjustable core 16 is provided with suitable lateral lugs or ears having the longitudinal slots 18, adapted to receive and contain the set-screws 17, by means of which the said core is secured in position; but obviously the said core may be variously secured to permit the desired adjustment to suit the taste of the constructor.

The torque produced by the shifting magnetism, which is a resultant of the coils 3 and 4, and the coil 19 is proportional to the watts through the meter or current multiplied by volts multiplied by cosine of the lag angle and is also proportional to the sine of the angle between the resultant magnetism of the coils 3 and 4 and the magnetism of the coil 19 with a given current and pressure. To obtain a speed that is proportional to the watts, I employ a permanent magnet 21, which embraces the armature 20 between its poles in a well-understood manner. The revolutions of the said disk armature are indicated by the registering mechanism 1 in the usual manner.

In Fig. 3 is shown the adjustable portion 16, which carries the phasing-coil 12, separated from the main core or portion 15 by the wooden block 26.

The adjustable portion of the impedance-core 16 may be so hinged to the main core as to admit of its being raised or lowered at one end, as shown in Fig. 4.

Fig. 5 shows a U-shaped core in combination with the adjustable portion 16.

Fig. 6 shows the manner in which the phasing-coils are wound in opposite directions upon the core 16, which enables them to add their electromotive force and currents in the same direction.

Figure 1:
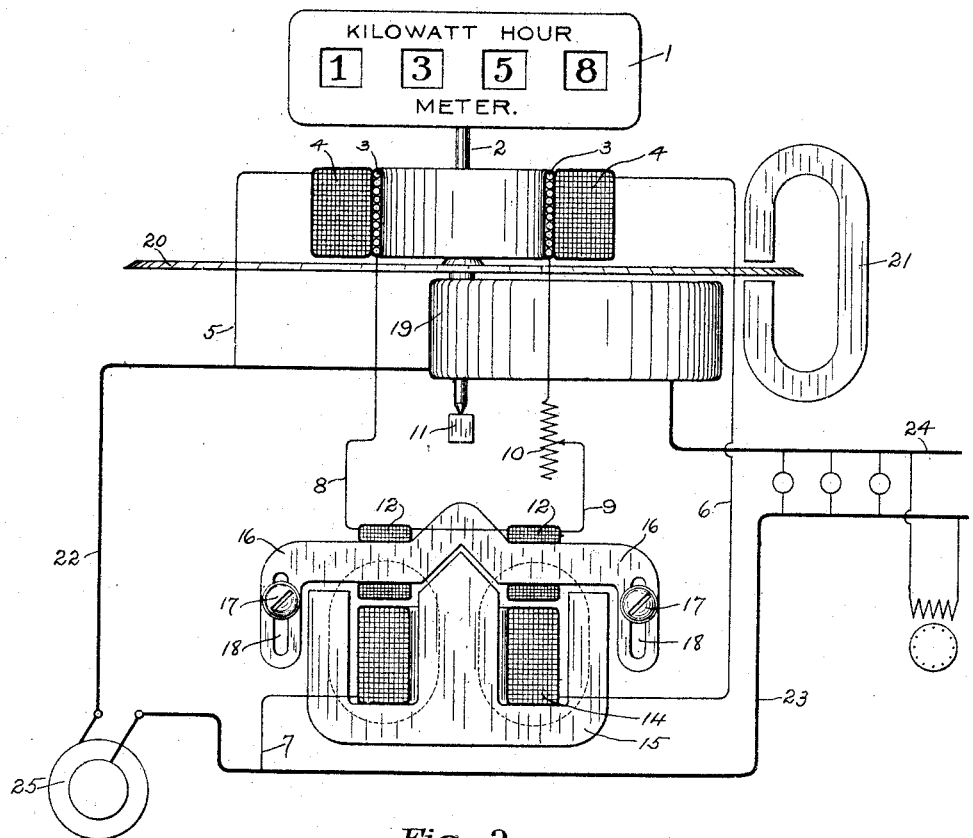
Figure 2:
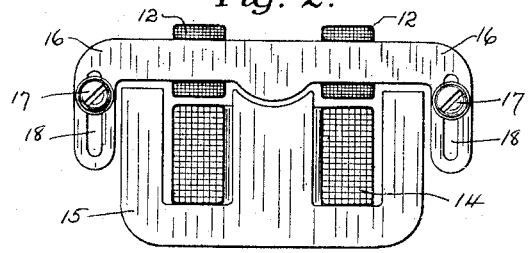

What I desire to secure by Letters Patent is—

1. In an induction-motor meter the combination of a series coil; a volt-coil; an impedance-coil in series with the said volt-coil; an iron core upon which is mounted the said impedance-coil, and is provided with an adjustable portion for the purpose set forth; phase-changing coils wound upon the adjustable portion; an auxiliary coil in coöperative relation with the said volt-coil and receiving current from the said phase-changing coils; an aluminium disk armature in inductive relation to the said series, volt and auxiliary coils; a spindle carrying the said armature; a registering-train operated by the revolutions of the said spindle; and a permanent magnet 21 arranged as shown for the purpose specified.

2. In an induction-motor meter a series coil; a volt-coil; an impedance-coil; a two-part core for said impedance-coil, one part of which carries the said impedance-coil and the other part forming an adjustable section as described; means for varying the position of the said adjustable core-section; a phase-changing coil or coils wound upon said adjustable core-section; an auxiliary coil in coöperative relation with the said volt-coil and receiving current by conduction from the said phase-changing coils; and a metallic closed circuited armature in inductive relation to the said series, volt and auxiliary coils.

3. In an induction-motor meter, the combination of a series coil; a volt-coil; an impedance-coil; a magnetic core for said impedance-coil having an adjustable section; a phase-changing coil or coils receiving current by induction from the adjustable portion or section of the said magnet-core, as set forth; means for obtaining a variable adjustment of said phase-changing coil or coils, and of said adjustable core-section, for the purpose set forth; an auxiliary coil in coöperative relation with the said volt-coil; a revoluble metallic armature; and a permanent magnetic field in coöperative relation with the said revoluble armature.

4. In an induction-motor meter a series coil; a volt-coil; an impedance-coil; phase-changing coils; a two-part magnetizable core, one part or section of which carries the said impedance-coil, the other section carrying the said phase-changing coils and being adjustably mounted in coöperative relation with the said impedance-coil for the purpose specified; an auxiliary coil in coöperative relation with the said volt-coil; a variable resistance in series with the said auxiliary and phase-changing coils; and a revoluble armature in inductive relation to the said series, volt and auxiliary coils.

5. The combination, in an induction-motor meter, of an impedance-coil or inductive resistance consisting of a coil 14, a laminated iron core 15, an adjustable core-section 16, a phase-changing coil or coils mounted as shown upon said adjustable core-section; and means for regulating the distance between the cores 15 and 16, as and for the purpose set forth.

Signed by me, at Fort Wayne, Allen county, State of Indiana, this 10th day of August, A. D. 1898.

THOMAS DUNCAN.

Witnesses:
PAUL A. MEYER,
JOHN B. MILLS.